(12) United States Patent
Beaumont (10) Patent No.: US 7,666,335 B2
(45) Date of Patent: Feb. 23, 2010

(54) CONTROLLING WARPAGE THROUGH MELT ROTATION TECHNOLOGY

(75) Inventor: John P. Beaumont, Harborcreek, PA (US)

(73) Assignee: Beaumont Technologies, Inc., Erie, PA (US)

(*) Notice: Subject to any disclaimer, the term of this patent is extended or adjusted under 35 U.S.C. 154(b) by 321 days.

(21) Appl. No.: 11/797,847

(22) Filed: May 8, 2007

(65) Prior Publication Data

US 2007/0296100 A1    Dec. 27, 2007

Related U.S. Application Data

(60) Provisional application No. 60/798,306, filed on May 8, 2006.

(51) Int. Cl.
*B29C 45/18* (2006.01)
(52) U.S. Cl. .................. 264/40.1; 264/328.12; 425/145; 425/542
(58) Field of Classification Search ................ 264/40.1, 264/328.12; 425/145, 542
See application file for complete search history.

(56) References Cited

U.S. PATENT DOCUMENTS

| | | | |
|---|---|---|---|
| 6,077,470 A | 6/2000 | Beaumont | |
| 6,503,438 B2 | 1/2003 | Beaumont | |
| 7,320,589 B2 * | 1/2008 | Babin et al. | 425/572 |
| 2005/0082706 A1 * | 4/2005 | Nagaoka et al. | 264/40.1 |
| 2006/0261521 A1 | 11/2006 | Beaumont | |

OTHER PUBLICATIONS

Fischer, Jerry; "Handbook of Molded Part Shrinkage and Warpage", 2003, Plastics Design Library, pp. 63-70.*

* cited by examiner

*Primary Examiner*—Jill L Heitbrink
(74) *Attorney, Agent, or Firm*—Oliff & Berridge, PLC (57) ABSTRACT

Methods and apparatus control the direction and/or magnitude of warpage in formed plastic parts through strategic repositioning of the non-homogeneous melt conditions across the stream of a laminar flowing fluid flowing through a flow channel to a desirable state. This may be used in combination with more conventional process variables, such as control of material temperature, pack pressure, and pack time. The invention is particularly useful in any solidifying or non-solidifying runner, or flow channel used to make products from laminar flowing fluids. The runner may be a cold-runner or hot-runner system that flow a stream of laminar flowing material, such as thermosetting or thermoplastic plastic (melt) through at least one runner flowing a non-homogeneous melt, and extruded or packed into a single or multiple-cavity mold. The repositioning is achieved by the use of one or more fluid rotation devices, which can be of fixed or adjustable types, strategically positioned in the flow channel of the runner system to affect a desirable change in warpage as a result of the melt condition repositioning.

26 Claims, 11 Drawing Sheets

CONTROLLING WARPAGE THROUGH MELT ROTATION TECHNOLOGY

CROSS-REFERENCE TO RELATED APPLICATIONS

This is a non-provisional application claiming priority under 35 U.S.C. §119(e) to U.S. Provisional Application Ser. No. 60/798,306, filed on May 8, 2006, incorporated herein by reference in its entirety.

BACKGROUND

This invention relates to methods and apparatus for controlling the direction and/or magnitude of warpage in molded plastic parts through strategic positioning of the non-homogeneous melt conditions across a stream of a laminar flowing fluid to a desirable circumferential position. This may be used in combination with more conventional process variables. The invention is useful in flow channels generally that flow a stream of laminar flowing material, such as thermoplastic or thermosetting plastics. The invention is particularly suitable for solidifying or non-solidifying runners, such as cold-runner or hot-runner injection molding machines that flow thermoplastic or thermosetting melt into a single or multiple cavity mold. The invention is also applicable to extrusion dies in which the melt conditions of the plastic can be strategically repositioned to achieve a desirable output condition from the flow channel to impart a desired material property to the flowing melt, such as to control a magnitude and/or direction of plastic part warpage.

Thermosets require heat to transition from a fluid to a solid state (the heat induces a chemical reaction) whereas thermoplastics must be cooled from a hot molten state to solidify. This is not a chemical reaction as found with thermosetting materials, but rather a phase change from liquid to solid. Thermosets are injected into a mold (via an injection molding machine or with use of a "transfer molding" process).

With thermoplastics the mold is cooled so that the plastic will solidify. A cold runner mold will also cool the runner after mold filling and the melt in the runner will solidify and must be removed every molding cycle. A hot runner will allow the runner material to remain molten during the entire molding cycle.

With thermosetting materials, the process is somewhat opposite to thermoplastics. A heated mold is used to allow the material to solidify. During injection molding or transfer molding, a fluid material is injected into a heated mold. The mold heats the material and initiates a chemical reaction causing the material to cross link and solidify. Normally the runner travels along the parting line similar to a cold runner thermoplastic mold. However, the runner is hot and the runner material solidifies with the molded parts and must be removed during every molding cycle. A cold runner system allows the material to remain fluid much like a hot runner used in thermoplastic molding.

Warpage of plastic parts is a result of variations in shrinkage within the part as it is being formed. Sources of such warpage of molded plastic parts have previously been poorly understood. These variations in shrinkage have generally been attributed to side to side variations in mold temperature, anisotropic shrinkage variations resulting from flow induced polymer and filler orientation, and global shrinkage variations (shrinkage variations between regions of a part) resulting from differences in wall thickness, mold temperature, melt temperature and melt pressure. Accordingly, when warpage in a particular mold design was discovered, attempts to correct the warpage typically involved modification to the melt temperature, mold temperature, fill rates, or an adjustment in pack pressure or pack time, or modifications to part geometry or gate locations.

SUMMARY

There is a need for improved methods and apparatus to correct or otherwise compensate for warpage in a plastic molded part.

There also is a need for improved methods and apparatus that enable control of the direction and/or magnitude of warpage in plastic molded parts.

During the injection molding process, high shear conditions developed in the runner can create significant material and melt temperature variations across its diameter. As the melt continues into the cavity, laminar flow conditions segregate these melt variations and cause them to be distributed into distinctly different regions within the part. The resultant uncontrolled distribution of these melt variations may be the root cause of warpage in many plastic parts. It must be understood that these variations cannot be controlled within the molding machine, but rather they must be managed throughout the entire melt delivery system itself.

Applicant has found that the segregated melt conditions developed in a runner are a significant contributor to warpage. Aspects of the disclosure provide methods of controlling the resultant warp through the strategic positioning of these melt conditions within the part. This may be achieved in certain exemplary embodiments by the use of one or more melt rotation devices, such as those marketed and licensed under the Beaumont Meltflipper® technology, strategically placed in the runner system to adjust the non-homogeneous melt conditions in the runner system of an injection mold to compensate for or otherwise offset warpage.

It has also been found that the non-homogeneous melt conditions developed in a runner continue into a part forming cavity and affect the warpage of plastic parts. Accordingly, exemplary embodiments of the disclosure provide systems and methods to control the direction and magnitude of part warpage by strategically repositioning these non-homogeneous melt conditions entering the mold. In certain embodiments, the repositioning can occur in conjunction with more conventional process variables.

Aspects of the disclosure also can adjust and control warpage caused by contributing factors other than non-homogeneous melt conditions by the same or similar melt rotation device strategically located in the runner system.

In a first exemplary embodiment, the fluid rotation device is non-adjustable and strategically placed in the flow path of the runner system to achieve desired warpage control.

In a second exemplary embodiment, the fluid rotation device is adjustable and strategically placed in the flow path of the runner system to achieve an adjustable desired warpage control.

In a third exemplary embodiment, the fluid rotation device may achieve removal of asymmetric melt conditions in the flow path, resulting in a desired symmetry in the melt conditions.

Those skilled in the art will realize that this invention is capable of embodiments that are different from those shown and that the details of the method and mold structure can be changed in various manners without departing from the scope of this invention. Accordingly, the drawings and description are to be regarded as illustrative in nature and are not to restrict the scope of the invention.

BRIEF DESCRIPTION OF THE DRAWINGS

Exemplary embodiments will be described with reference to the drawings, wherein.

DETAILED DESCRIPTION OF EMBODIMENTS

Warpage caused by the distribution of high and low sheared laminates within a cavity affects most molded parts. However, lack of understanding of this phenomenon results in its effects being misdiagnosed as variations in mold temperature or part geometry. Despite the potential significance of this phenomenon on the development of residual stress and warpage of mold parts, these effects have not been understood nor documented, let alone managed.

By understanding and being able to trace the locations of these high and low sheared laminates within a cavity, an engineer can better diagnose problems that may be occurring. These problems include, for example, residual stresses in a part, warpage and cosmetics. Of further importance is the ability to manage these non-homogeneous melt conditions in order to address the observed problems.

The management of these non-homogeneous melt conditions provides a method of controlling part warpage, which has not existed until this time. Managing the position of the high sheared laminates in conjunction with controlling of other process variables, such as packing pressure and/or time, has the potential of controlling both direction and magnitude of warpage.

If one side of a part is formed from low sheared cooler material it will shrink differently than the side formed from the high sheared hotter material. During the packing phase of a molding cycle, the magnitude of shrinkage can be controlled. A part molded with a long high pack pressure will shrink less than one formed with low pack pressures over short durations of time. Varying the pack time and pressure will also vary the shrinkages of the regions of the part formed from low and high sheared material and thereby effect there relative shrinkages which will thereby effect warpage.

Figure 1:
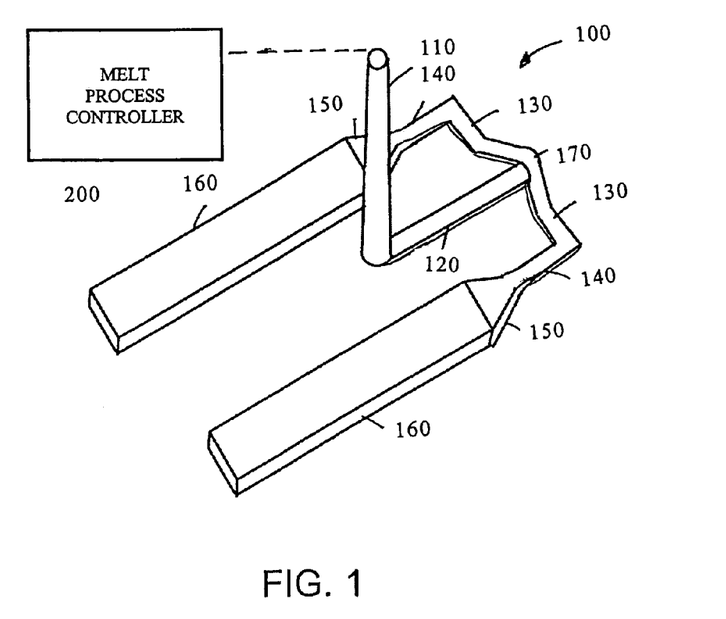
FIG. 1 illustrates an exemplary two cavity mold and runner system in which a melt rotation device is provided at the intersection of primary and secondary runners.

With reference to FIG. 1, injection molding of a part is achieved using an injection mold 100 comprising a sprue 110, one or more runners 120, 130, 140, and a gate 150 for each mold cavity 160. The runners may include a primary runner 120, a branch runner 130, and optional further branching runners (unshown). Although shown as a multi-cavity mold, aspects of the disclosure equally apply to a single mold cavity. Moreover, although shown in the context of a cold runner system, aspects of the invention also apply to hot runner systems or any other solidifying or non-solidifying runner or flow channel used in making products from laminar flowing fluids.

During injection molding a significant amount of pressure is required to drive the molten plastic through the sprue, runner, gate and cavity. This pressure is energy, which is transferred into the melt as heat. The actual temperature of the melt as it passes through the mold is the sum of this heat input minus heat lost through thermal conductivity to the relatively cold mold. The adiabatic temperature rise can be approximated from:

$$\Delta T = \frac{\Delta P}{C_p \times \rho} \qquad \text{Equation \#1}$$

where $\Delta T$ is melt temperature rise; $\Delta P$ is pressure drop through a flow channel; $C_p$ is specific heat; and $\rho$ is melt density.

Temperature rise in a melt during injection can be developed from two factors. The first is from pressurization of the melt. However, this effect is relatively small (less than 4 C at pressures over 140 MPa).

The second source of heat input into the melt is a result of frictional heat which results from shear as the melt is driven along the stationary walls of the flow channel (consisting of the sprue 110, runner 120-140, gate 150 and cavity 160). Shear rates, the measure of relative velocity of the flowing melt to the stationary wall and relative to itself, are commonly calculated to be over 10,000 sec-1 in a mold runner. The shear rate is derived from the calculated velocity profile of the melt as it flows through a channel. Equation 2 is for the Rabinowitch corrected velocity profile of a non-Newtonian fluid.

$$v_{x(r)} = R^{\left(\frac{1}{n}+1\right)} \left(\frac{\Delta P}{2\mu L}\right)^{\frac{1}{n}} \left(\frac{1}{\frac{1}{n}+1}\right) \left[1 - \left(\frac{r}{R}\right)^{\left(\frac{1}{n}+1\right)}\right] \quad \text{Equation \#2}$$

where v is the velocity profile in the radial direction; R is the radius of the flow channel; n is the power law index; $\Delta P$ is pressure; $\mu$, is viscosity; L is the length of the flow channel; and r is the radial distance through the radius R.

Figure 2:
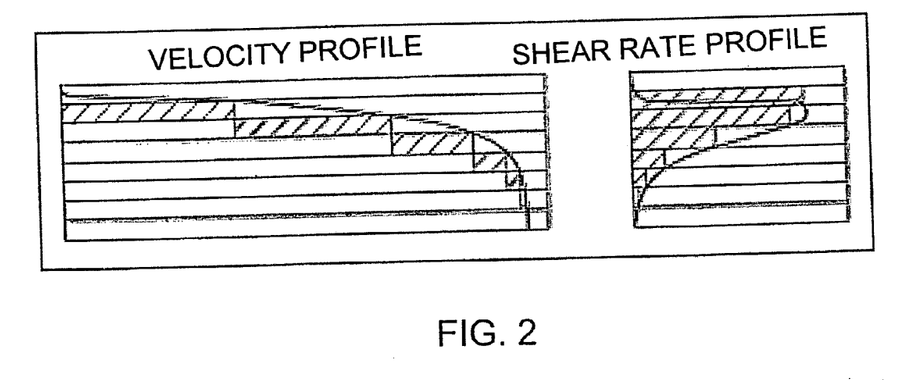
FIG. 2 shows a velocity profile and shear rate profile of a material flowing through a mold.

FIG. 2 shows the resultant velocity profile of a non-Newtonian laminar flowing fluid through the flow channel of FIG. 1. Shear rate ($\lambda$) (Equation #3) is derived from the velocity profile as the rate of change $dv_z$ with change in radius (dr) This equation is generally simplified to calculate maximum shear rate (Equation #4).

$$\gamma = \frac{dv_2}{dr}\bigg|_{r=R} \quad \text{Equation \#3}$$

$$\gamma = \left(\frac{\sigma_R}{\mu}\right)^{\frac{1}{n}} = \left(\frac{4Q}{\pi R^3}\right)\left(\frac{\frac{1}{n}+3}{4}\right) = \left(\frac{4Q}{\pi R^3}\right)\left(\frac{3n+1}{4n}\right) \quad \text{Equation \#4}$$

Equation #4 is the Rabinowitch corrected shear rate where Q is flow rate. Upon reviewing FIG. 2, it can be seen that the most dramatic rate of change in the velocity profile occurs at the interface with the stationary channel wall and the flowing plastic. As shear rate is greatest near the channel wall it can be expected that this is the location of the greatest shear induced heating of the melt. In the center of the flow channel, the velocity profile flattens and a tangent line drawn at the center would show a zero rate of change. Therefore, there is a zero thermal gain from shear.

As the melt in a cold runner system is flowing along a relatively cold channel, a certain amount of the heat from the melt will be conducted out. A heated mold channel may provide for heat to be conducted in, however. The heat in the melt would be the sum of the heat gained from the injection barrel of the molding machine plus the heat generated from shear plus heat conducted from, or to, the flow channel wall. In a cold runner mold used with thermoplastics the net bulk average temperature of the melt would be dependent on a balance of heat in from the molding machine and heat generated from shear vs. heat lost to conduction. Under high shear conditions, it can be expected that heat in from shear is dominant. The opposite would occur under low shear conditions. Under most molding conditions it can be expected that shear heating will be dominant in the runners of a mold. It was found that bulk temperature rise from shear, through a thermoplastic cold runner test mold, averaged about 4° C. (dependent on material and flow rate). This is over 10 times more than the transient heat gained from pressure and remains in the melt after it is purged from a mold. These measured findings have excellent agreement with the temperature rise predicted from injection molding simulation and are within 20% of that calculated from Equation #1.

Based on this, it should be expected that a temperature gradient exists across the melt stream within a runner. In a thermoplastic cold runner system, just inside of an outer freezing layer would be a fast flowing high temperature layer surrounding a relatively cooler center layer. The center laminates would be near the same as the temperature of the melt as originally introduced from the molding machine, as they are not directly affected by the high shear near the perimeter. Given a bulk temperature rise of the melt of 40 C, it should be realized that this is an average temperature that includes the zero sheared material in the center and the highly sheared material around the perimeter of the flow channel. Therefore, it can be concluded that the melt temperature in the perimeter must be much higher than 40 C.

At least the principle of shear and thermal variations across a runner is understood by those knowledgeable of melt rheology. However, the effect of this on molding is much less understood. The most significant effect of these shear and thermal variations across a runners melt stream has been documented in a number of studies in recent years. These studies have focused on mold filling imbalances developed in multi cavity molds as a result of the segregation of these laminates when a runner is divided into multiple branches, such as those shown representatively in FIG. 1.

Figure 3:
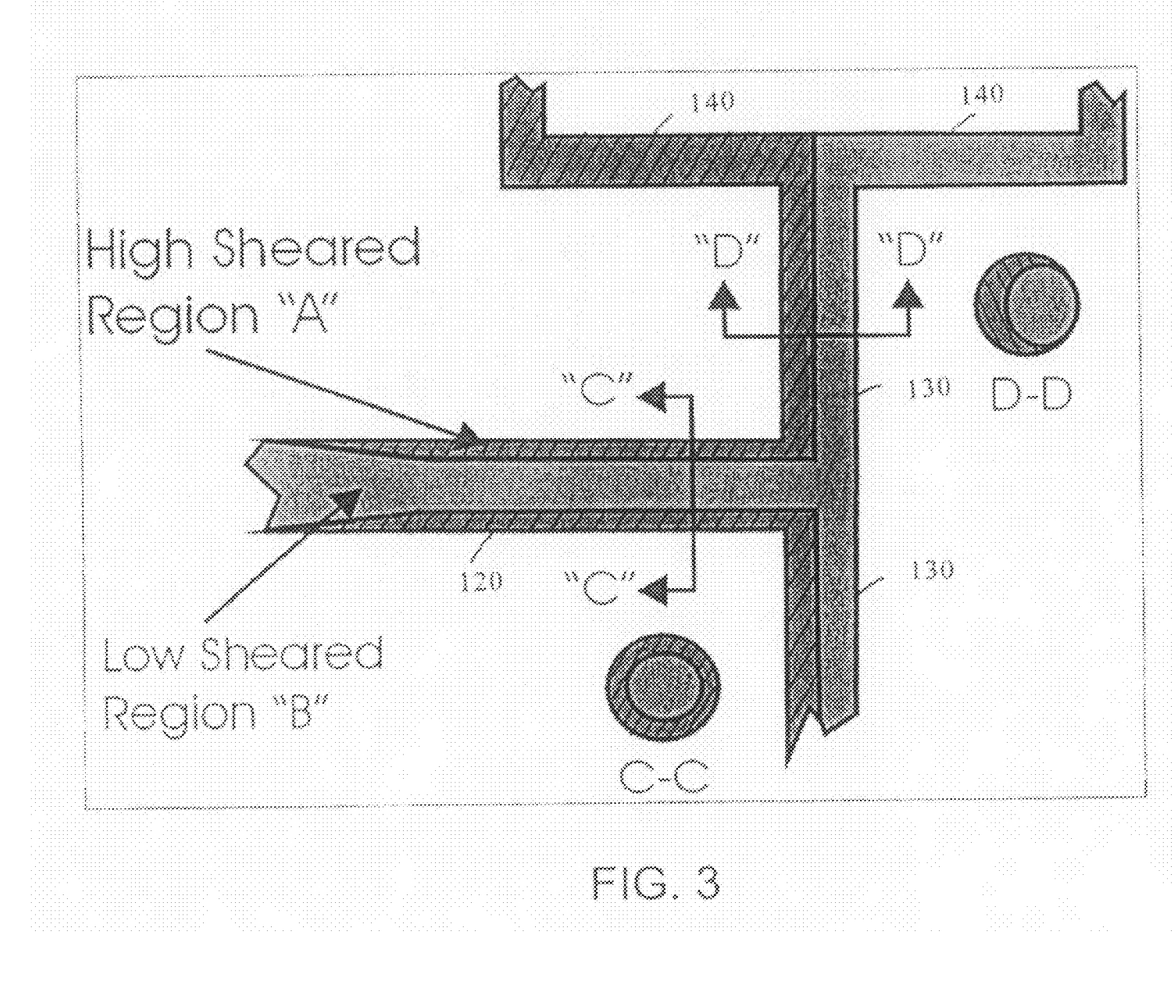
FIG. 3 illustrates a partial view of a runner system showing laminar flow conditions in primary and branching runners.

FIG. 3 is a sectional partial view of a branch runner system, such as that shown in FIG. 1. When a runner 120 having shear and thermal variations (FIG. 3) is split at a runner branch 130, the characteristic laminar flow of the material will cause the high sheared hotter material to form on the near side of a branching runner and the low sheared cooler material to form on the opposite far side of the branching runner (cross section D-D in FIG. 3). The result is a shear and thermal variation from side to side of the branching runner. Previous studies have shown with a further downstream tertiary branching runner 140, a filling imbalance will exist between the further branching runners as the high sheared hotter material proceeds down one branch and the low sheared material down the other as shown.

Figure 4:
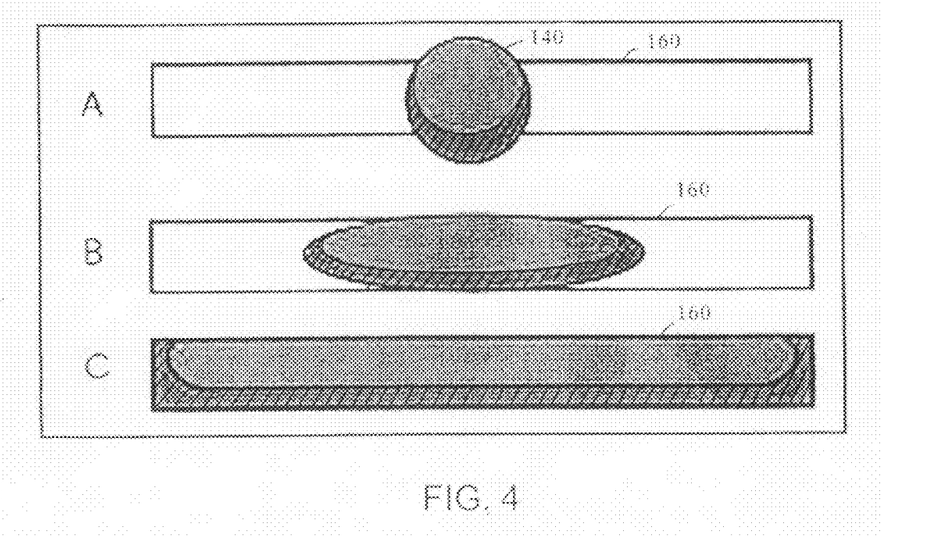
FIG. 4 illustrates the distribution of high and low sheared material developed in the runner within a mold cavity and their approximate repositioning within a part forming cavity.

Given the above conditions, and the knowledge that polymer flow is laminar during injection molding, it should be expected that the same side to side thermal variations created in a branching runner will continue into a part forming cavity. FIG. 4 shows the expected distribution of the high and low sheared material in a part fed from a runner 140 having the asymmetric melt conditions shown in position "A" taken at the end of the runner system at the entrance to mold cavity 160. The high sheared hotter material on the bottom side of the runner flows along the bottom side of the parts wall while the lower sheared cooler material flows along the top side of the parts. This is shown in position "B" taken from within the mold cavity 160 as the melt is beginning to fill the cavity, as well as in position "C" also taken from within mold cavity 160, but after completion of filling. This distribution is much like that developed in co-extrusion dies fed from a co-extrusion feed block. The actual distribution of these high and low sheared regions within a cavity, however, will depend on their prior orientation in the runner.

Figure 5:
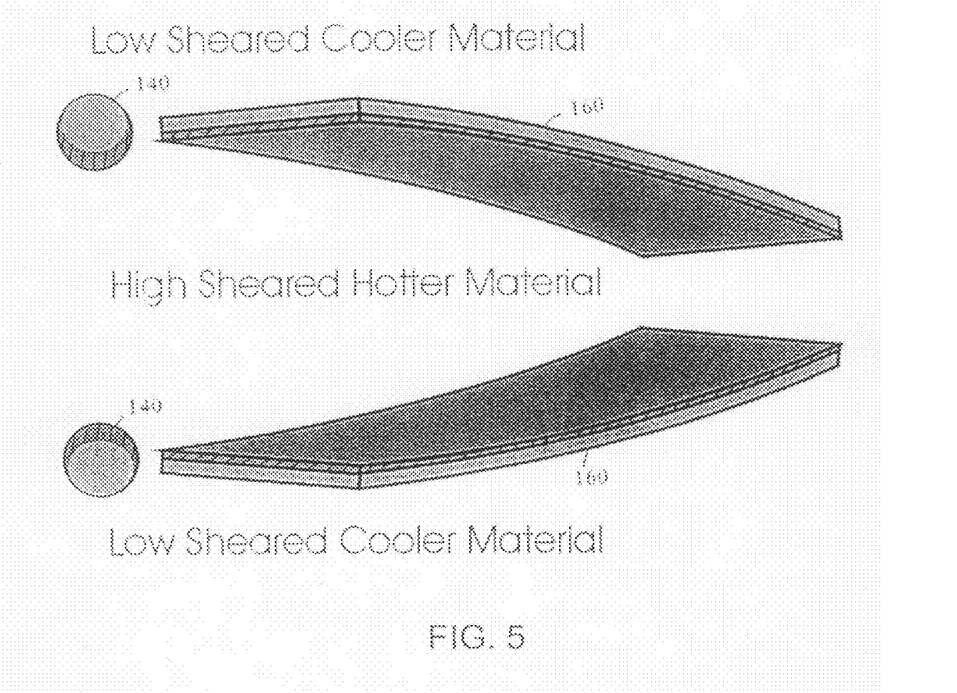
FIG. 5 illustrates the affect of warpage expected from the positioning of high and low sheared material developed in the runner system.

As a result of these asymmetric melt conditions it can be expected that one region of a given part will be formed with melt conditions, which can be considerably different than another region of a part. A region of the part formed from the high sheared hotter material from the runner might be expected to shrink more than a region formed from the low sheared cooler material. The relative shrinkage regions create a residual stress that could warp the part. FIG. 5 illustrates the warpage that could result from the high sheared hotter material from the runner being positioned on the bottom or top of a part. The resultant variation in shrinkage between the top and bottom surface may cause the part to warp if the warp stresses exceed physical properties of the plastic material. For illustration purposes, the asymmetrical profile of the runner feeding into each cavity is shown next to the cavity.

In the past, when such warpage was observed, various process parameters (typically mold temperature and/or pack pressure) were adjusted, while retaining the flow channel unchanged in an attempt to remedy the observed warpage. However, if an observed warpage can be traced to this thermal melt variation, it has been found that the non-homogeneous melt conditions could be repositioned by a change in the flow channel geometry, such as through addition of a fluid rotation device 170 (FIGS. 1, 10 and 14-17) within the flow channel, in order to counter the observed warpage.

Further, if a part is found to be warping from other influence, such as wall thickness variations or non-uniform mold cooling, again, the high and low sheared laminates may be used to counter this warp by inducing a counter effect from generation of a desired asymmetric or symmetric melt condition in the flow channel to provide a desired profile to the mold cavity during filling. This positioning of high and low sheared material is not limited to a top and bottom side of a part as shown in FIG. 5. Rather, the high and low sheared material may be placed in any position within the cavity which results in countering a non-desirable warpage or creating a warpage to achieve a required part shape. This could include countering warpage that resulted from variations in part wall thicknesses or non-uniform mold cooling. Further melt flow within a part forming cavity results in orientation of polymer chains and fillers or reinforcements, which may be within the polymer. These orientations can set up anisotropic shrinkages that can effect part warpage. Again, by strategically positioning the high and low sheared melt conditions within the cavity, one can control the flow orientation so as to control warpage.

Figure 6:
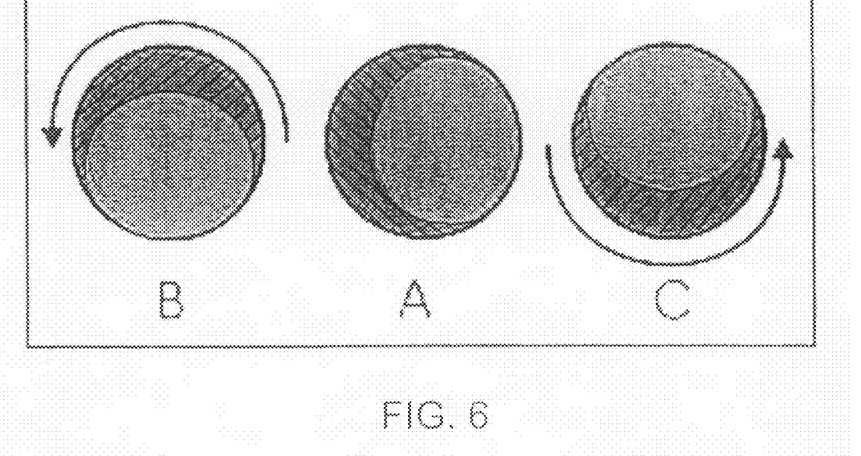
FIG. 6 illustrates examples of alternate positioning of the high and low sheared material developed in the runner to offset warpage effects achieved through melt rotation.
Figure 7:
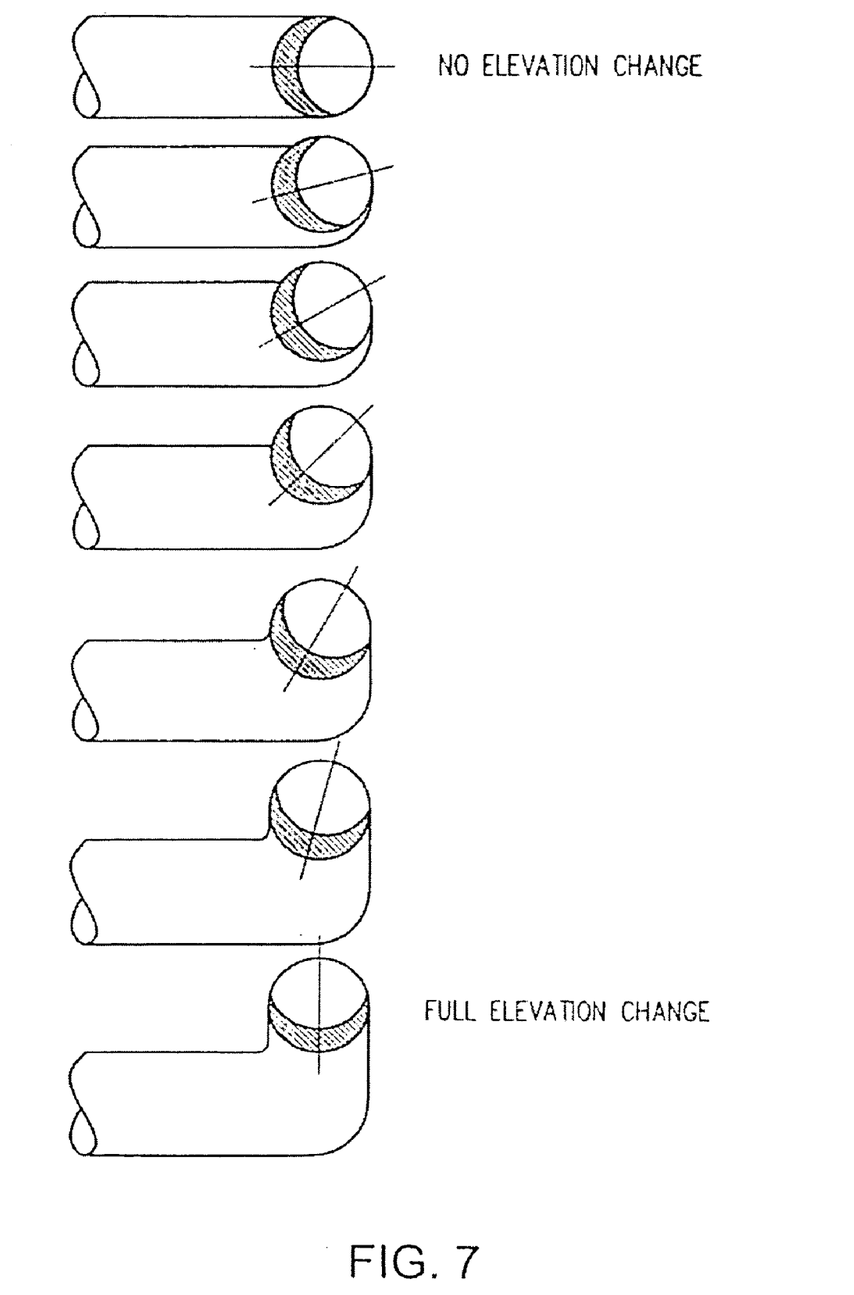
FIG. 7 illustrates further examples of repositioning of the high and low sheared material achieved through melt rotation.
Figure 8:
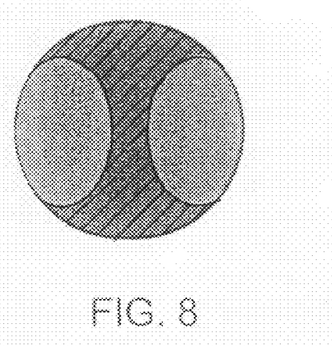
FIGS. 8 and 9 illustrate additional examples of more complex repositioning arrangements arrangement through melt rotation.
Figure 9:
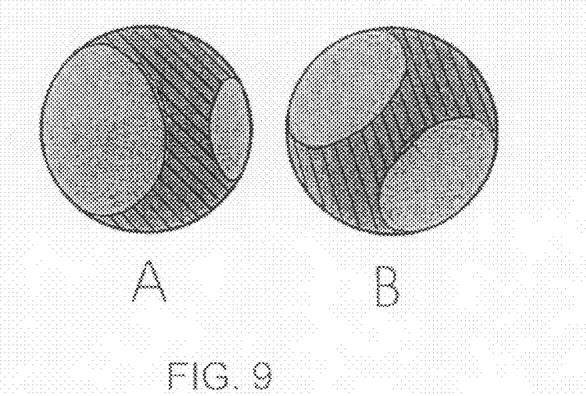

FIG. 6 shows some basic exemplary variations in melt positioning. Positions "B" and "C" correspond to the top and bottom positioning of the high shear laminates shown previously in FIG. 5, resulting from the +/−90° rotation relative to the position shown in "A." However, it should be realized that the positioning of the high sheared laminates are not limited to those shown in FIG. 6. For example, the relative positioning of the low and high sheared material could be anywhere circumferentially around the runner as shown in FIG. 7. Alternatively, the positioning may be distributed through the runner in various organized arrangements including, but not limited to, those shown in FIG. 8-9.

Achieving such repositioning of the melt can be achieved using a melt rotation device, such as the devices shown in exemplary FIGS. 14-17B, or any of the devices shown in U.S. Pat. No. 6,077,470 to Beaumont, U.S. Pat. No. 6,503,438 to Beaumont et al., or U.S. Patent Application Publication No. US-2006-0261521 to Beaumont, the disclosures of which are hereby incorporated herein by reference in their entireties.

Shrinkage in plastic molded parts can be effected by both thermal and orientation effects. Plastics will go through thermal contraction as they transition from a molten material to a solid. This thermal contraction will continue as it cools to room temperature. Therefore, a warmer region of a part will be expected to go through more thermal contraction than a cooler region. Additionally, if the part is formed from a semi-crystalline plastic material it will crystallize more if it is formed in a hotter mold. The net thermal effect will cause warmer regions to shrink more than cooler regions. This will create a stress between the regions that can cause the part to warp relative to the high and low shrink regions. FIG. 5 shows this effect when the hotter and cooler melt are on opposite side of a part. The hotter material is represented by the light color and the cooler material by the darker color.

Potentially countering this effect is shrinkage resulting from molecular orientation developed during mold filling and packing. If a plastic part is being filled with plastic having different temperatures, the hotter plastic will flow more easily (by having a lower viscosity), experience lower shear stresses, and thereby lower orientation. This in turn could reduce the orientation induced shrinkages. In FIG. 5, this could result in the hotter material flowing along one side (lighter side) having lower orientation than the opposite side where the cooler material would be flowing (darker side). The result is that the more oriented cooler side could want to shrink more than the hotter side resulting a potential to warp in the opposite direction as shown in FIG. 4. Whether thermal or orientation effects are dominate is dependant on the material and the conditions under which it was molded. Regardless of which is dominate, by controlling the position of these high and low sheared laminates one could have some degree of control of the warpage in a molded part.

A two cavity mold shown in FIG. 1 was designed with the following layout. The runner diameter (of element 120) was 3 mm and the mold cavity (160) was 25 mm wide×120 mm long×1.5 mm thick. A fan gate 150 fed the part and provisions were made for inserts to be placed at the intersection of the primary and secondary runner 120, 130. Exemplary inserts (such as those illustrated in FIGS. 14-17) serve as melt rotation devices 170 and include variations of melt rotation technology that rotate the melt approximately plus or minus 90 degrees. "A" in FIG. 6 illustrates the normal position of the high and low sheared laminates after the runner branch. "B" and "C" in FIG. 6 illustrate the resultant positions established with the melt rotation technology entering the two mold cavities. By this means the melt rotation technology places the high sheared laminates on either the top or bottom side of the part to control desired warping of the molded parts. However, aspects of the disclosure are not limited to this. Instead, various embodiments can be rotated by any suitable degree of rotation as shown in FIG. 7 to achieved desired control of part warpage.

Sample parts were molded from Polypropylene (PP), Polybutylene Terephthalate (PBT), and Acrylonitrile-Butadiene-Styrene (ABS). Materials were prepared and processed according to the manufacturer's recommended conditions. For each material an optimum two stage molding procedure was established. The process was allowed to stabilize for ten minutes before collecting parts.

In this study, affects of placing the high sheared laminates on opposite (top and bottom) sides of the test plaques were evaluated. This study also looked at the ability to control the direction and magnitude of warpage by varying pack time. An optimum packing pressure was established for each material. The low pack pressure was determined as the pressure required to just fill the part. The high pack pressure was determined to be the pressure that first showed signs of flashing the part cavity. Optimum pack pressure was judged as the pressure midway between the low and high pack pressures. Gate freeze studies were performed and four pack times were selected. Two pack times were selected before and two were chosen after the gate freeze times. For each of the test materials, the process was allowed to stabilize for ten minutes prior to collecting samples for measurement. The melt rotation technology was used to place the high sheared laminates on the top (stationary side) and bottom (ejector side) sides of the part. This was repeated for each of the three sample materials.

After molding, the parts were hung vertically by their runners in order to maintain uniform cooling and minimize any external factors that could potentially influence warpage. The parts were measured after hanging for 24 hours in an environmentally controlled room.

The warpage of the parts was measured using an Optical Gaging Products inspection system with the parts fixed at the end opposite the gate. The fixed end of the part established a horizontal plane from which warpage was determined by measuring the vertical distance at the gate end of the part relative to this horizontal plane.

Warpage data was measured relative to a horizontal reference plane along the fixed end of the sample part. As the samples were measured upside down (bottom/ejector side facing up) positive warpage values indicate that the part is warping in the bottom direction and negative values indicate that the part is warping toward the top side of the part. Since parts molded without melt rotation technology warped towards the ejection side of the mold, this direction was specified as the positive warpage direction.

Figure 11:
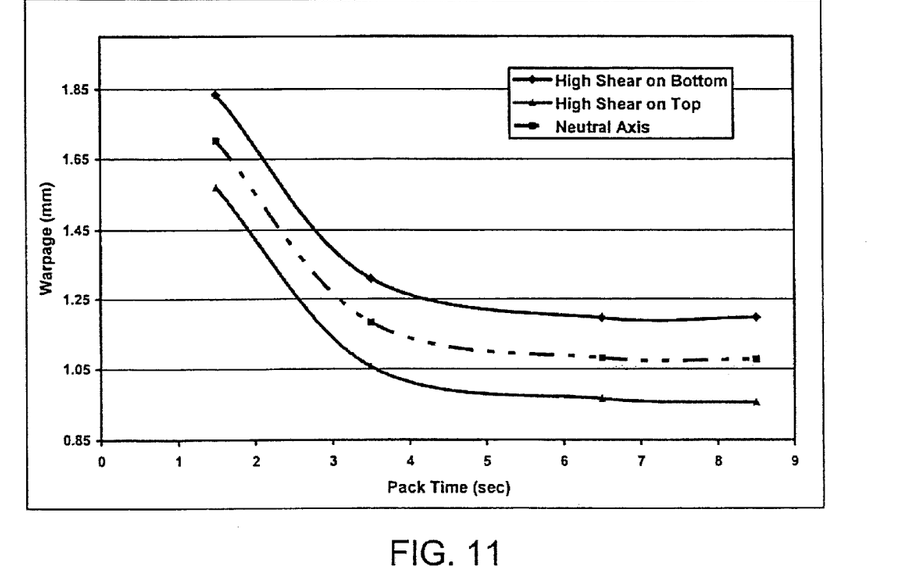
FIG. 11 illustrates a graph showing warpage relative to a neutral position for an ABS sample.
Figure 12:
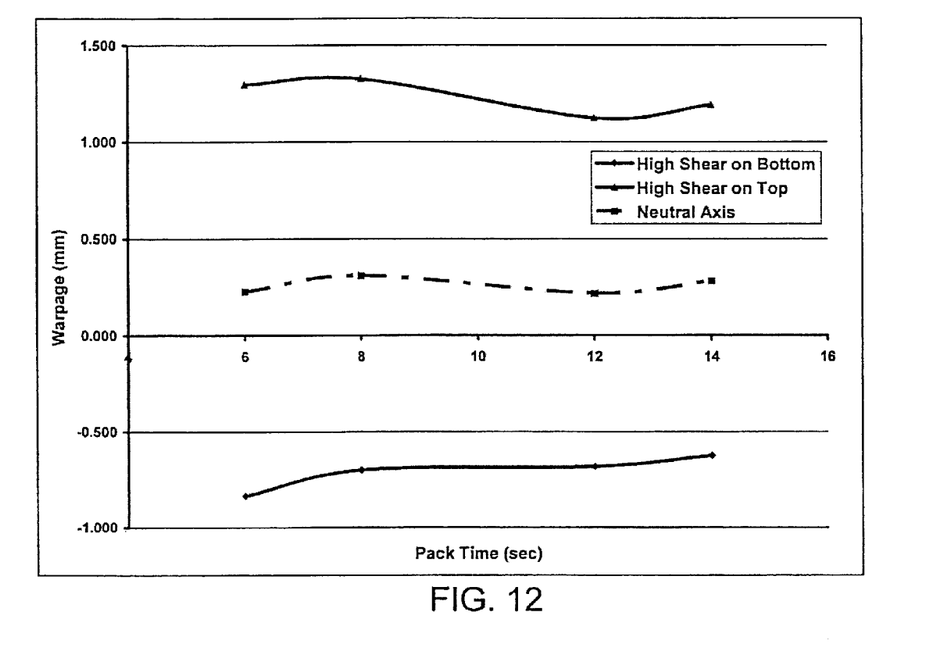
FIG. 12 illustrates a graph showing warpage relative to a neutral position for a PP sample.

FIGS. 11 and 12 are graphs of pack time versus warpage at a constant pack pressure. The neutral plane is a theoretical representation of warpage without the use of melt rotation. The top and bottom curves represent the actual warpage values as affected by the location of high sheared laminates at increasing pack times. The ABS samples in FIG. 11 show that as pack time was increased, warpage was decreased from 1.8 mm to 1.2 mm with the high shear on the bottom. Warpage also decreased from 1.57 mm to 0.97 mm with increasing pack time, once the high shear was placed on the top. The warpage, as related to the position of the high and low sheared laminates, at all pack times were in opposite directions relative to the neutral warpage axis. FIG. 12 shows similar data for Polypropylene. Note that placing the high sheared material had an opposite effect on direction of warpage than found with the ABS plastic. However, the reaction to increasing pack time was similar in that warpage decreased with increasing pack time. With the high sheared material on the bottom, the warpage decreased from −0.85 mm to −0.60 mm with increasing pack time. When the laminates were rotated to the top, the warpage decreased from 1.30 mm to 1.12 mm with increasing pack pressure.

Figure 13:
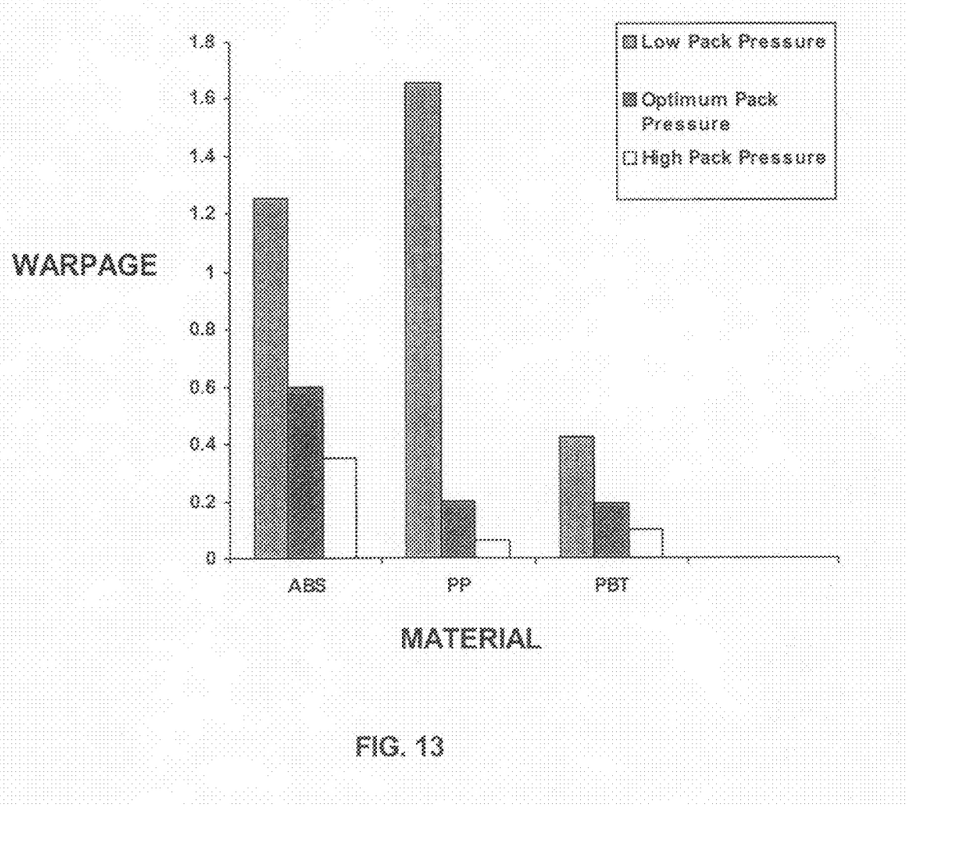
FIG. 13 illustrates a graph showing the warpage of three different materials with respect to pack pressure and positioning of high and low sheared material.

FIG. 13 is a summary of the various studies of warpage as affected by positioning the high sheared laminates and varying pack pressure. Each of the bars represents the average warpage found at each of the four pack times (found in FIGS. 11 and 12) relative to the neutral plane. The three bars, for each material, contrasts the impact of pack pressure. The ABS samples warped a total of ±1.2 mm from the neutral plane with the lowest pack pressure. Once the pack pressure was increased to the optimum setting, the warpage decreased to a value of ±0.59 mm. As expected, the highest pack pressure had the least amount of warpage with a value of ±0.095 mm. This trend of decreasing warpage with increasing pack pressure was seen with all three materials.

From the results of this study it can be seen that positioning of the high sheared laminates has a direct effect on how a part warps. For all materials tested, there was a tendency for the parts to warp in the positive direction. This could have been a result of the force of ejection, side to side variations in mold temperature or some other phenomenon. Therefore, when evaluating the direction of warpage, as impacted by the positioning of the high sheared material, the warpage direction was relative to this neutral warpage position, referenced in this paper as the "neutral axis".

This study found that the direction and magnitude of the warpage of the materials tested could be controlled. However, it found that the warpage direction of the semi-crystalline materials was opposite to the amorphous ABS.

The amorphous ABS clearly followed the warpage as illustrated in FIG. 5 that indicates a thermal shrinkage dominance. The ends of the test plaque parts always warped toward the side where the high sheared hotter material was positioned. The effect of pack pressure on this directional warpage also had expected consequences. Increasing pack pressure and pack time, decreased the amount of the directional warpage as controlled by position of the high sheared laminates. Thus, melt repositioning may achieve directionality control of warpage while additional process variation control, such as pack pressure and time, can further achieve control of warpage magnification.

Interestingly, the direction of warpage of the semi-crystalline materials were opposite to the behavior of the amorphous ABS. In this study, the melt was rotated in the runner and strategically positioned such that the high and low sheared materials flow along opposite sides of the test plaques (top and bottom surfaces). It was originally theorized that the side with high sheared material would be hotter and therefore the end of the parts would bow toward that side (see FIG. 5). However based on the results of this study it was found that with the semi-crystalline material, it can also be expected that the colder material flowing along the opposite side of the part wall should experience higher shear stresses. It is generally recognized that high shear stress locally contributes to increasing the amount crystallization that will occur in a semi-crystalline material. This is commonly found in gate regions of molded parts. Additionally, the high shear stress would cause these crystals to be oriented in the direction of the principle strain, which would be in the direction of melt flow. The combination of the increased crystallization and the orientation of these crystals along the surface formed by the low temperature material is perceived to cause this surface to shrink more than the opposite surface, formed by the hotter melt.

This opposite to original theory directional warpage behavior was very distinct with the polypropylene. As a result, an additional material (PBT) was added to see if the behavior was consistent between semi-crystalline materials. The results of the PBT study were similar, but less distinct. Under most pack conditions the warpage direction followed that of the polypropylene. However at the highest pack pressure the warpage direction reversed and followed that of the amorphous ABS.

Based on the findings, it appears that semi-crystalline materials behave differently and may require a different repositioning of the melt flow to achieve desired melt flow into the mold cavity to control warpage. However, this can be determined through experimentation with a particular flowable material and various monitored repositioning of the fluid melt condition.

The injection molding machine has limited one dimensional linear control over velocity and pressure of the melt once it leaves the injection nozzle. The machine can cause the material to flow faster or slower, and with more pressure or less pressure. But as the material leaves the nozzle and enters the mold, the molding machine has no control over the significant material property variations that are developed within the polymer as it flows through the melt delivery system and into the cavities. These material property variations are created in the mold, and must be controlled within the mold. The variations have been shown to significantly affect part warpage and dimensional stability. This study revealed a new means of controlling the direction and magnitude of part warpage by combining various process changes along with the ability to manage the position of high sheared laminates within the molded parts through the use of melt rotation technology.

The knowledge and methods revealed in this study provide a new level of in-mold process control systems. By adding melt rotation within the melt delivery system, the mold now becomes an integral component of advanced process control, providing the ability to strategically control the location of high sheared material within the molded parts. The added control allows molders to change the quality and characteristics of the molded parts, including part warpage, shrinkage, residual stresses and mechanical properties without changing part geometry or gate location. Potential applications would include allowing a designer who is experiencing a warpage problem to strategically position the asymmetric melt conditions to counter and control the expected warpage. In an existing mold experiencing an undesirable warpage, melt rotation technology could be applied to position the asymmetric melt conditions to counter the observed warpage. This method provides a whole new dimension of process control that can be positioned locally within a mold.

Figure 10:
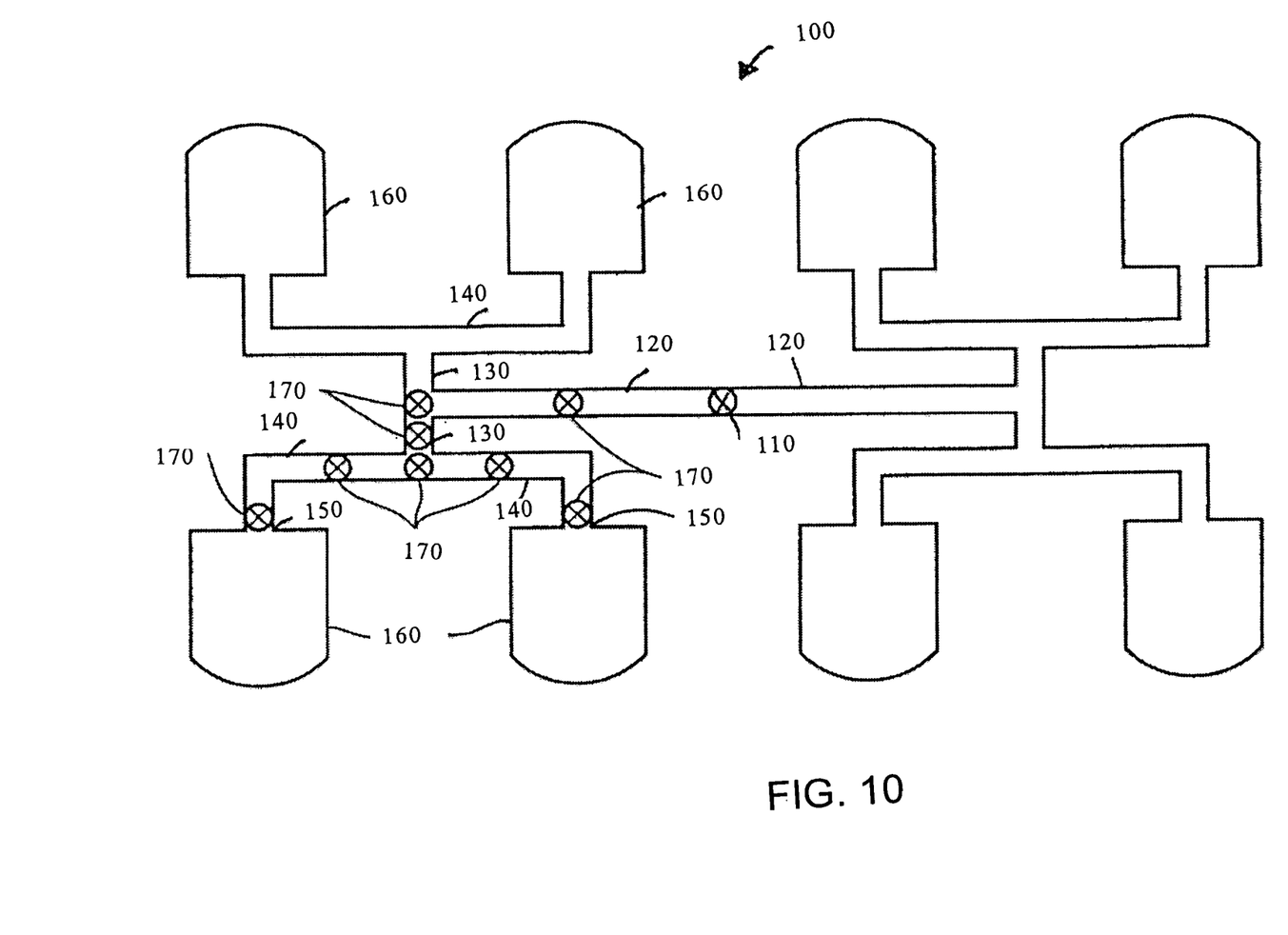
FIG. 10 illustrates an exemplary balanced runner system and multi-cavity mold and suitable locations for providing a melt rotation device.

Various melt rotation devices 170, such as those illustrated in FIGS. 14-17, can be strategically placed at one or more locations in the flow channel of the mold runner system of an injection mold to reposition asymmetric melt conditions to a desirable asymmetric or symmetric condition to control the direction and/or magnitude of warpage as shown diagrammatically in FIG. 10. For example, depending on the runner and mold cavity design, one or more melt rotation devices 170 can be provided in one or all primary runners 120, secondary branch runners 130, any further branch runners, and/or gates 150 of a particular mold cavity 160 as shown.

Figure 14:
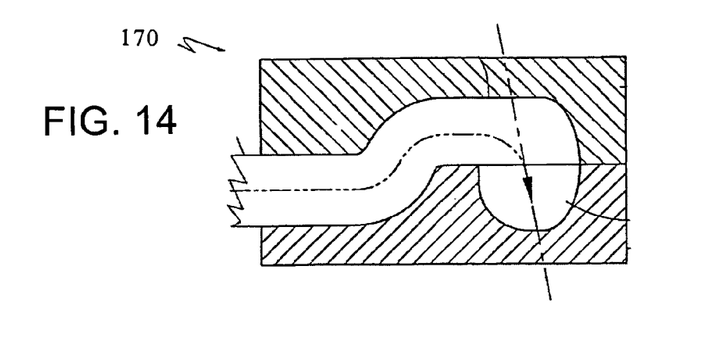
FIG. 14 illustrates an exemplary fixed melt rotation device strategically placeable in the flow channel of the injection mold runner system to reposition the asymmetric melt conditions to control part warpage.

In a first exemplary embodiment shown in FIG. 14, a fixed melt rotation device 170 can be strategically placed in a flow channel of an injection mold runner system (at least one up to possibly all of the positions shown in FIG. 10). This can achieve, for example, a 90° rotation such as that shown in FIG. 6. This type of melt rotation device is more specifically described in U.S. Pat. No. 6,077,470 to Beaumont, the disclosure of which is incorporated herein by reference in its entirety.

Figure 15A:
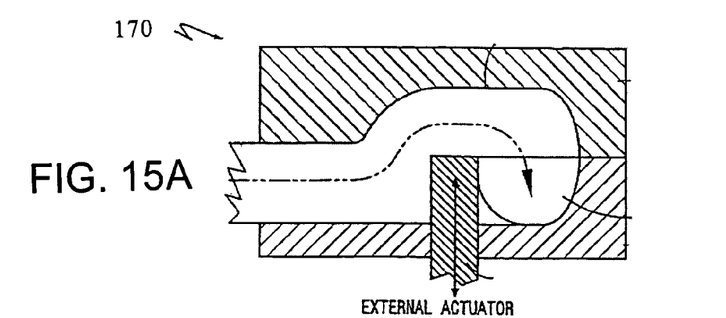
FIGS. 15A-C illustrate an exemplary adjustable melt rotation device at three varying positions to achieve an adjustable degree of melt rotation to control part warpage.
Figure 15B:
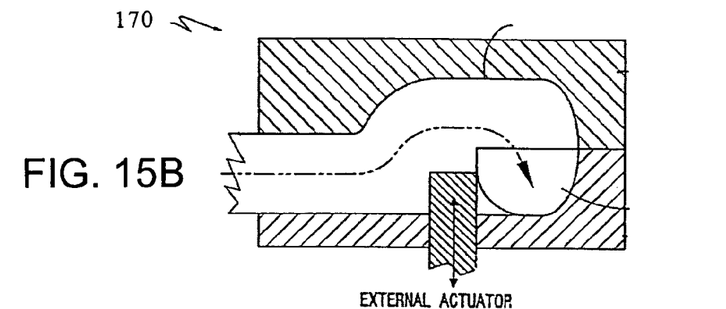
Figure 15C:
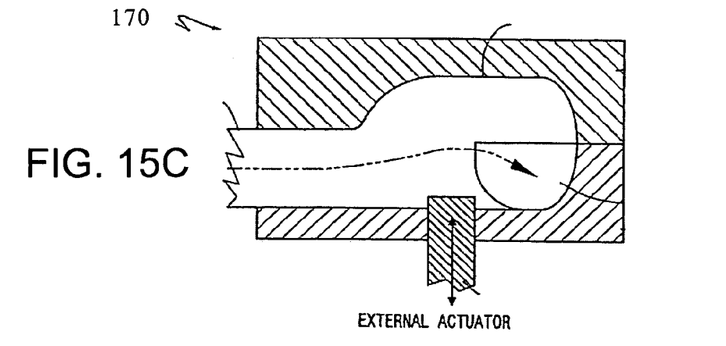

In a second exemplary embodiment shown in FIGS. 15A-C, an adjustable melt rotation device 170 can be strategically placed in a flow channel of an injection mold runner system (one or more of the positions shown in FIG. 10). This type of melt rotation device is more specifically described in U.S. Patent Application Publication No. US-2006-0261521 to Beaumont, the disclosure of which is incorporated herein by reference in its entirety. With this type of device, the degree of rotation is not fixed, but adjustable by manipulation of an adjustable component of the melt rotation device to achieve anything from the near 90° rotation in FIG. 15B or C to nearly no rotation in FIG. 15A.

Figure 16:
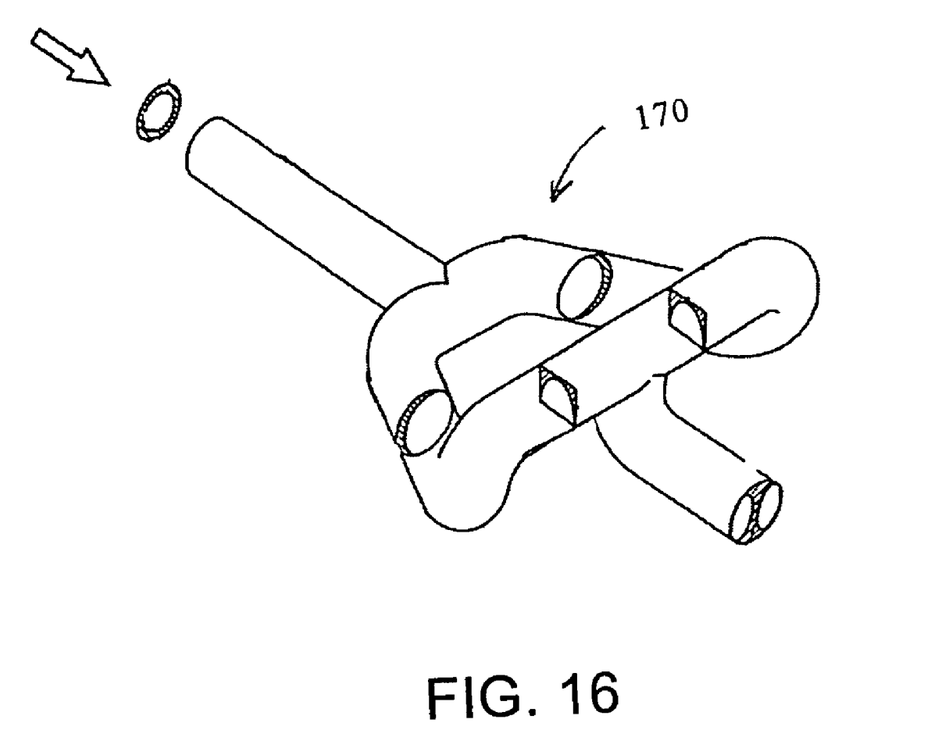
FIG. 16 illustrates an exemplary fixed melt rotation device strategically placeable in the flow channel of the injection mold runner system to reposition the asymmetric melt conditions and convert them to a generally symmetrical condition to control part warpage.

In a third exemplary embodiment shown in FIG. 16, a fixed melt rotation device 170 can be strategically placed in a flow channel of an injection mold runner system (one or more of the positions shown in FIG. 10). This type of melt rotation device is not limited to repositioning the asymmetrical melt conditions to a rotated asymmetric condition, but instead can achieve a repositioning that results in a generally symmetrical configuration such as those shown in FIGS. 8 and 9. A suitable melt rotation device of this type is more specifically described in U.S. Pat. No. 6,503,438 to Beaumont et al., the disclosure of which is incorporated herein by reference in its entirety.

Figure 17A:
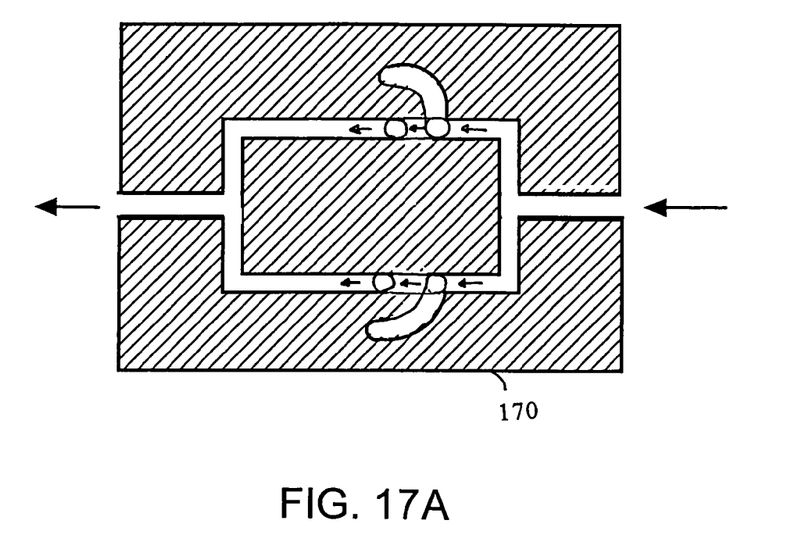
FIGS. 17A-B illustrate an exemplary adjustable melt rotation device shown in two different positions that can reposition asymmetric melt conditions and convert them to a generally symmetrical condition to control part warpage.
Figure 17B:
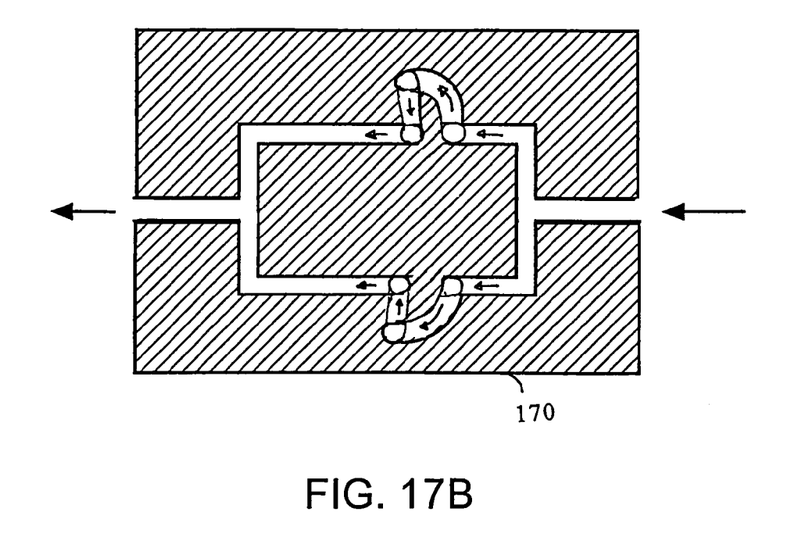

In a fourth exemplary embodiment shown in FIGS. 17A-B, an adjustable melt rotation device 170 can be strategically placed in a flow channel of an injection mold runner system (one or more of the positions shown in FIG. 10). This type of melt rotation device is similar to that shown in FIG. 16, but is adjustable to provide a variable degree of rotation to each of two different flow paths that are recombined. A suitable melt rotation device of this type is more specifically described in U.S. Patent Application Publication No. US-2006-0261521 to Beaumont, the disclosure of which is incorporated herein by reference in its entirety.

In any of the above embodiments, control of part warpage can be augmented by specific control of other process variables in combination with the repositioning of the melt condition. For example, the mold 100 may include a melt process controller 200 that allows adjustment of a process parameter, such as the temperature of the material flowing through the runner system, or pack pressure. Controller 200 can take conventional forms and may be embodied in hardware or software. An exemplary embodiment includes a CPU having an input for receiving processing commands, a memory for storing processing instruction code, and an output connected to the mold 100 that enables adjustment of molding process parameters.

The invention has been described with reference to several preferred embodiments, but these embodiments are illustrative and non-limiting. Various modifications, substitutes and/or improvements may be possible within the spirit and scope of the invention.

What is claimed is:

1. A method of repositioning of a non-homogeneous melt condition which occur in a direction across the flow path of laminates of a stream of laminar flowing material in a runner of a mold to control at least one of the direction and magnitude of warpage in plastic molded parts, comprising:
    determining an undesirable warpage condition in a plastic part to be formed in a mold having a defined runner system that delivers a stream of laminar flowing, non-homogeneous material to at least one mold cavity;
    controlling the non-homogeneous melt conditions within the runner by strategically positioning a melt rotation device in the runner to control direction and magnitude of warpage in resultant plastic parts molded in the at least one mold cavity; and
    adjustment of at least one molding process variable to assist in control of the warpage direction and/or magnitude.

2. The method according to claim 1, wherein the controlling is by a melt rotation device of the fixed type that achieves a desired rotation of the non-homogeneous melt conditions to achieve a desired control of warpage.

3. The method according to claim 2, wherein the fixed type melt rotation device achieves an asymmetric melt condition.

4. The method according to claim 2, wherein the fixed type melt rotation device achieves a generally symmetrical melt condition.

5. The method according to claim 1, wherein the controlling is by a melt rotation device of the adjustable type that achieves a desired rotation of the non-homogeneous melt conditions to achieve a desired control of warpage.

6. The method according to claim 5, wherein the adjustable type melt rotation device achieves an asymmetric melt condition.

7. The method according to claim 5, wherein the adjustable type melt rotation device achieves a generally symmetrical melt condition.

8. The method according to claim 1, wherein the warpage direction control is achieved by the melt rotation device and warpage magnitude control is achieved by the adjustment of at least one molding process variable.

9. The method according to claim 1, wherein the process variable is selected from the group of material temperature, pack pressure, flow rate and pack time.

10. The method according to claim 1, wherein the method is performed in a cold runner mold.

11. The method according to claim 1, wherein the plastic part is a thermosetting or thermoplastic part.

12. A method of repositioning of a non-homogeneous melt condition which occur in a direction across the flow path of laminates of a stream of laminar flowing material in a runner of a part forming system to control at least one of the direction and magnitude of warpage in formed plastic parts, comprising:

determining an undesirable warpage condition in a plastic part to be formed in a part forming system having a defined runner system that delivers a stream of laminar flowing, non-homogeneous material through a flow channel during formation of the plastic part; and controlling the non-homogeneous melt conditions within the runner by strategically positioning a melt rotation device in the flow channel to control direction and magnitude of warpage in resultant formed plastic parts; and adjustment of at least one molding process variable to assist in control of the warpage direction and/or magnitude.

13. The method according to claim 12, wherein the warpage direction control is achieved by the melt rotation device and the warpage magnitude control is achieved by the adjustment of the at least one molding process variable.

14. A mold including a melt rotation device for controlling non-homogeneous melt conditions which occur in a direction across the flow path of laminates of a stream of laminar flowing material flowing through a flow channel to control the direction and/or magnitude of warpage in molded plastic parts, comprising:

a mold body having at least one mold cavity and at least one branching runner through which a stream of laminar flowing material flows to fill the at least one mold cavity; and at least one melt rotation device located downstream of a last branch in at least a portion of the runner in which the non-homogeneous conditions occur across the stream of laminar flowing material, the melt rotation device being strategically positioned in the flow channel defined by the at least one runner to individually control the position of the non-homogeneous melt conditions and control warpage direction and magnitude of at least one individual plastic molded part resulting from the filling of an individual one of the at least one mold cavity downstream from the at least one melt rotation device.

15. The mold according to claim 14, wherein the melt rotation device is of the fixed type and achieves a desired rotation of the non-homogeneous melt conditions to achieve a desired control of warpage.

16. The mold according to claim 15, wherein the fixed type melt rotation device achieves an asymmetric melt condition.

17. The mold according to claim 15, wherein the fixed type melt rotation device achieves a generally symmetrical melt condition.

18. The mold according to claim 14, wherein the melt rotation device is of the adjustable type and achieves a desired rotation of the non-homogeneous melt conditions to achieve a desired control of warpage.

19. The mold according to claim 18, wherein the adjustable type melt rotation device achieves an asymmetric melt condition.

20. The mold according to claim 18, wherein the adjustable type melt rotation device achieves a generally symmetrical melt condition.

21. The mold according to claim 14, further comprising a melt condition controller that allows adjustment of at least one molding process variable to assist in control of the warpage direction and/or magnitude.

22. The mold according to claim 21, wherein the process variable is selected from the group of material temperature, pack pressure, flow rate and pack time.

23. The mold according to claim 14, wherein the mold is a cold runner mold.

24. The mold according to claim 14, wherein the plastic part is a thermosetting or thermoplastic part.

25. A part forming system including a melt rotation device for controlling non-homogeneous melt conditions which occur in a direction across the flow path of laminates of a stream of laminar flowing material flowing through a flow channel to control the direction and/or magnitude of warpage in formed plastic parts, comprising:

at least one branching runner forming a flow channel through which a stream of laminar flowing material flows during formation of the parts by filling of at least one mold cavity defining the parts; and at least one melt rotation device located downstream of a last branch in at least a portion of the runner in which the non-homogeneous conditions occur across the stream of laminar flowing material, the melt rotation device being strategically positioned in the flow channel defined by the at least one runner to desirably position the non-homogeneous melt conditions and individually control warpage direction and magnitude of individual plastic parts formed by the system from filling of an individual one of the at least one mold cavity.

26. The part forming system according to claim 25, further comprising a melt condition controller that allows adjustment of at least one molding process variable selected from the group of material temperature, pack pressure, flow rate and pack time to assist in control of the warpage direction and/or magnitude.

* * * * *